United States Patent
Heil et al.

(10) Patent No.: US 7,392,633 B2
(45) Date of Patent: Jul. 1, 2008

(54) DEVICE AND METHOD FOR PROCESSING PACKAGES WHICH ARE CONTINUOUSLY PREPARED ON CARRIER ELEMENTS

(75) Inventors: Michael Heil, Mönchengladbach (DE); Thomas Vetten, Düsseldorf (DE)

(73) Assignee: SIG Technology Ltd., Neuhausen am Rheinfall (CH)

( * ) Notice: Subject to any disclaimer, the term of this patent is extended or adjusted under 35 U.S.C. 154(b) by 64 days.

(21) Appl. No.: 10/561,824

(22) PCT Filed: Jun. 24, 2004

(86) PCT No.: PCT/EP2004/006839

§ 371 (c)(1),
(2), (4) Date: Oct. 6, 2006

(87) PCT Pub. No.: WO2005/005289

PCT Pub. Date: Jan. 20, 2005

(65) Prior Publication Data

US 2007/0028562 A1    Feb. 8, 2007

(30) Foreign Application Priority Data

Jun. 24, 2003    (DE) ............................. 103 28 545

(51) Int. Cl.
*B65B 3/04*    (2006.01)
(52) U.S. Cl. .......................................... 53/250; 53/282
(58) Field of Classification Search .................. 53/250, 53/282; 198/626.1, 803.2, 803.14, 867.01, 198/867.02, 867.03, 867.04, 867.05, 867.06, 198/867.07, 867.08, 867.09, 867.11, 867.12, 198/867.1
See application file for complete search history.

(56) References Cited

U.S. PATENT DOCUMENTS

| | | | |
|---|---|---|---|
| 2,781,122 | A | 2/1957 | Gueffroy |
| 2,943,724 | A | 7/1960 | McCoy |

(Continued)

FOREIGN PATENT DOCUMENTS

| | | |
|---|---|---|
| CH | 672477 | 11/1989 |
| DE | 10154203 | 6/2002 |
| DE | 20309797 | 8/2003 |
| EP | 0126553 | 8/1990 |
| EP | 0623515 | 11/1994 |
| EP | 1035022 | 9/2000 |
| EP | 1215122 | 6/2002 |

OTHER PUBLICATIONS

German Office Action dated February 5, 2004.

*Primary Examiner*—John Sipos
(74) *Attorney, Agent, or Firm*—The Webb Law Firm

(57) ABSTRACT

The invention relates to a device and a method for supplying and processing packages arranged on carrier elements, especially drinks packages, using a continuous conveyor belt on which the carrier elements are arranged. The aim of the invention is to be able to further process carrier elements which are continuously supplied by means of a conveyor belt in a processing station in a reliable manner with few technical resources. To this end, two advancing rollers are provided to the right and to the left of the conveyor belt, the rotational axes thereof being perpendicular to the plane of the conveyor belt; two rotating clock belts are provided in the running direction of the conveyor belt, behind the advancing rollers; said clock belts rotate in a plane parallel to the plane of the conveyor belt, and respectively comprise a strand facing the other clock belt; and the strands facing each other run parallel to each other, at a distance corresponding to the width of the carrier elements.

8 Claims, 2 Drawing Sheets

U.S. PATENT DOCUMENTS

Figure 1:
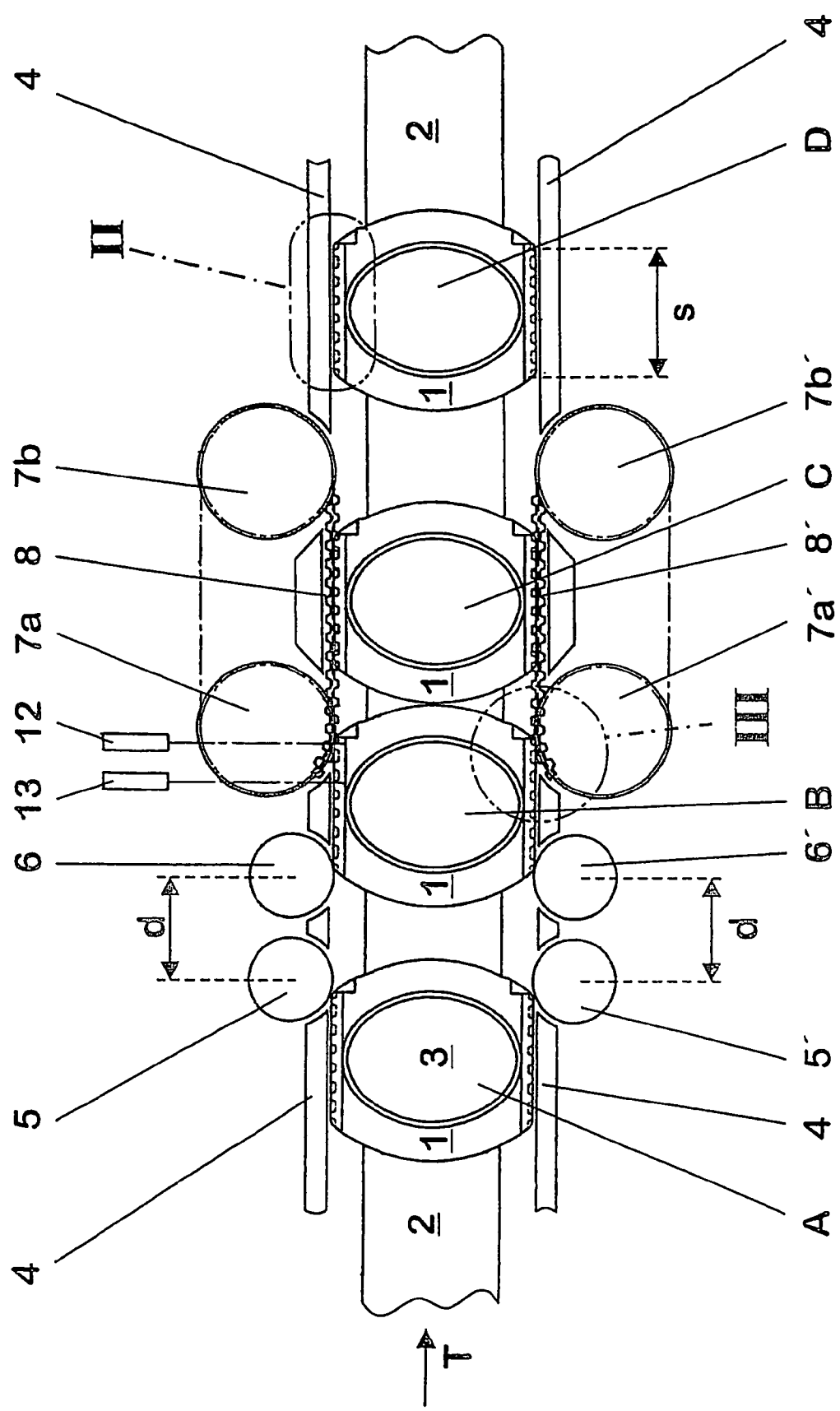

| | | | |
|---|---|---|---|
| 3,231,063 A | 1/1966 | Talbot | |
| 3,443,838 A * | 5/1969 | Jung | 198/867.13 |
| 4,473,989 A | 10/1984 | Tsutsumi et al. | |
| 4,601,384 A | 7/1986 | van Doren | |
| 5,529,168 A * | 6/1996 | Soriano et al. | 198/465.1 |
| 6,082,077 A * | 7/2000 | Christ | 53/250 |
| 6,176,369 B1 | 1/2001 | Petrovic | |
| 6,269,942 B1 * | 8/2001 | Mader et al. | 198/795 |
| 6,390,272 B1 * | 5/2002 | Tsutsui | 198/343.1 |
| 6,719,123 B2 * | 4/2004 | Jackson et al. | 198/626.1 |

\* cited by examiner

DEVICE AND METHOD FOR PROCESSING PACKAGES WHICH ARE CONTINUOUSLY PREPARED ON CARRIER ELEMENTS

The present invention relates to a device and a method for supplying and processing packs, especially beverage packs, arranged on support elements with a continuously running conveyor belt, wherein the support elements are arranged on the conveyor belt, wherein two revolving cycle belts are provided after the drawing rollers seen in the running direction of the conveyor belt, wherein the cycle belts revolve in a plane parallel to the plane of the conveyor belt, wherein the cycle belts each have a side facing the other cycle belt and the sides facing one another run parallel to one another at a distance which corresponds to the width of the support elements.

In machines for filling single-use composite packs, preformed pack blanks are placed on support elements which are then conveyed on a continuously running conveyor belt from one processing station to the next. The processing stations in this case comprise further forming and sealing stations as well as filling stations and stations for finally closing the packs. The use of a continuously running conveyor belt on which the support elements with the packs are arranged and which is used for transport from one station to the next has the advantage that no complex regulation of the conveyor belts is required. In addition, such a transport system can easily be changed over to a different pack shape or a different pack format merely by exchanging the support elements.

In such a transport system, support elements provided with packs, possibly incoming in batches, are further transported to the next processing station, wherein a backlog possibly occurs before the next processing station if the complete batch is not further processed in a processing step at the same time. However, this backlog does not result in problems since the continuously running conveyor belt can slide away under the support elements.

The device having all of the features of the preamble of claim 1 is known from the U.S. Pat. No. 2,781,122.

However, in the area of the processing stations there is then a technical problem with such a transport system if the support elements provided with packs need to be processed individually. In such a case, the support element must be supplied individually in a controlled fashion to the processing station and positioned exactly in the processing station. In this case it is desirable to keep the expenditure on apparatus as low as possible and leave the support elements arranged on the conveyor belt in the simplest case.

It is thus the object of the present invention to arrange and further develop a device and a method of the type specified initially and described previously in detail such that support elements supplied continuously via a conveyor belt can be further processed reliably and with little technical expenditure in a processing station wherein the support elements should be positionable individually and accurately.

This object is solved with regard to the device according to the preamble of claim 1 by providing two drawing rollers on the right and left of the conveyor belt, whose axes of rotation are perpendicular to the plane of the conveyor belt.

As a result of controlled movement of the drawing rollers, the support elements can be transferred individually into a draw-in position. From the draw-in position the support element is then taken over by the cycle belts arranged at the side of the conveyor belt as soon as the cycle belts have been set in motion and are then positioned in the processing station.

When the support elements have reached the desired position in the processing station, the movement of the cycle belts is stopped and the processing can take place. In this case, a controlled movement of the cycle belts allows an exact positioning of the support elements.

Since the support elements are continuously in engagement with the cycle belts, the support elements can remain on the conveyor belt, wherein the conveyor belt slides away under the support element. It is thus not necessary to raise the support elements.

The accuracy of the positioning is further increased because the relative position between cycle belt and support elements is specified. This is achieved by cycle belts having a toothed structure on the sides facing one another and by the support elements also being provided with a toothed structure on the side walls.

According to a further teaching of the invention, the cycle belts are constructed as toothed belts, which are each guided by two toothed belt disks. The slippage between the driven toothed belt disks and the cycle belts is thus minimised which further increases the accuracy of the positioning of the support elements.

A further embodiment of the invention provides that a sensor is provided for detecting a draw-in position of the support elements so that the cycle belt is only set in motion when a support element has actually reached the draw-in position.

In order to facilitate the take-up of the support elements by the cycle belts and the transfer to the conveyor belt, it is especially advantageous if the front and rear teeth of the support elements seen in the transport direction have an enlarged spacing compared with the middle teeth.

In order that the speed of the support elements can be reduced shortly before reaching the draw-in position to avoid an abrupt stop, it is preferable if a second sensor is provided to detect a braking position.

Draw-in rollers whose axes are arranged perpendicular to the plane of the conveyor belt are preferably provided in front of the drawing rollers seen in the transport direction of the support elements. These prevent subsequent support elements from following the previously drawn in support element during movement of the drawing rollers. When the draw-in position is reached by a drawn-in support element, no "back pressure" occurs from the subsequent support elements.

The movement of the support elements on the path into the draw-in position is preferably continuously controlled, with the distance of the draw-in rollers from the drawing rollers being smaller that the side length of the support elements. In this case, the support elements are continuously in engagement either with the draw-in rollers or the drawing rollers. It is furthermore preferred if the distance of the draw-in rollers from the drawing rollers is between 1 mm and 10 mm, preferably 2 mm to 5 mm, shorter than the side length of the support elements.

In terms of method, the object is solved by the following steps:
  drawing in a support element from a waiting position into a draw-in position,
  transporting the support element from the draw-in position into a processing position by movement of the revolving cycle belts arranged at the side of the support element,
  processing the pack on the support element in the processing position with the cycle belts stationary.
  further transport of the support element by means of the cycle belts and
  transfer to the continuously running conveyor belt.

With regard to the advantages of the method according to the invention, reference is made to the advantages already specified regarding the features of the device.

Figure 2:
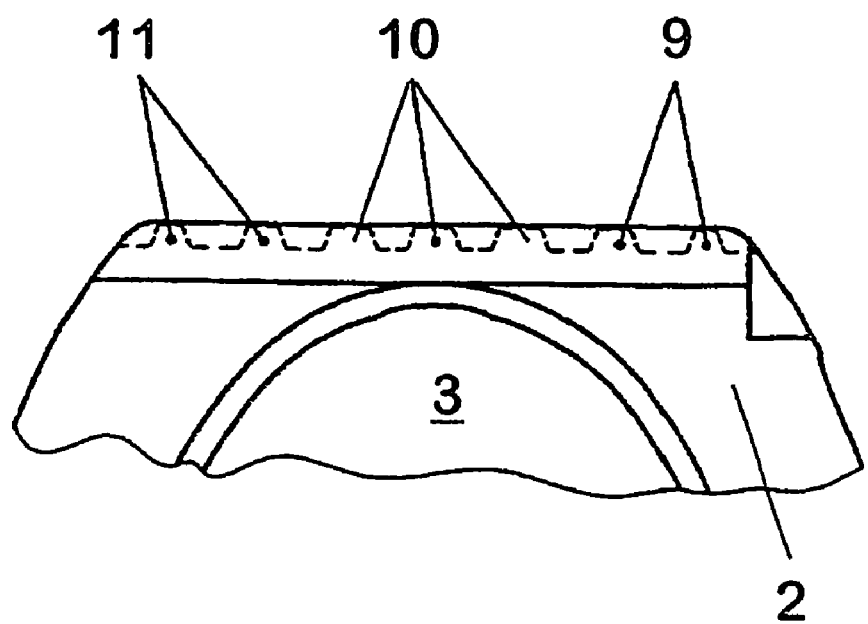
Figure 3:
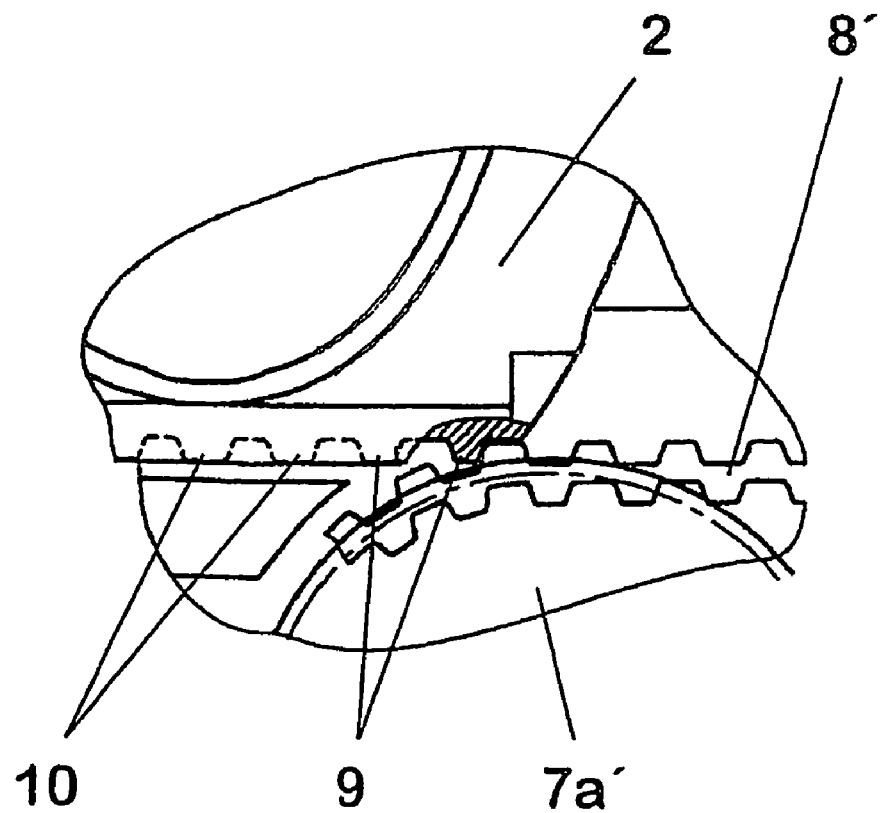

The present invention is explained in further detail subsequently with reference to the drawings which show merely one exemplary embodiment. In the figures FIG. 1 is a plan view of the device according to the invention, FIG. 2 is an enlarged view of the section identified as II in FIG. 1 and FIG. 3 is an enlarged view of the section identified as III in FIG. 1.

FIG. 1 shows a device for supplying and processing packs arranged on support elements 1, wherein these preferably comprise pack blanks for drinks packs not shown. The device according to the invention has a conveyor belt 2 which moves at constant speed continuously in a transport direction T. The support elements 1 are arranged vertically on the conveyor belt 2, the support elements 1 having a receptacle 3 at the centre. The pack blanks not shown can be inserted in the receptacle 3 for further processing.

Guides 4 are provided to the right and left of the conveyor belt 2, which take over the lateral guidance of the support elements 1 during the transport by the conveyor belt 2. In this case, the support elements 1 merely stand on the conveyor belt 2 and the surface of the conveyor belt 2 and the underside of the support elements 1 have a low-friction surface so that the conveyor belt 2 can slide away under the support elements 1 if the latter are held fixed.

The device according to the invention also has draw-in rollers 5, 5' arranged to the right and left of the conveyor, the draw-in rollers 5, 5' extending perpendicular to the conveyor belt 2. The distance between the draw-in rollers 5, 5' correspond to the width of the support elements 1.

Further rollers, and specifically drawing rollers 6, 6' are arranged at a distance d after the draw-in rollers 5, 5' seen in the direction of transport T of the support elements 1, whose axes of rotation also run perpendicular to the conveyor belt 2. The drawing rollers 6, 6' also have a distance from one another which correspond to the width of the support elements 1. The distance d of the drawing rollers 6, 6' from the draw-in rollers 5, 5' is smaller than the side length s of the support elements 1.

Provided after the drawing rollers 6, 6' seen in the direction of transport T of the support elements 1 and to the side of the conveyor belt 2 are pairs of toothed belt disks 7a, 7b and 7a', 7b' about which respectively one cycle belt 8, 8' runs and by which the disks 7b and 7b' are driven. The cycle belts 8, 8' have a toothed structure on the inside and on the outside and run in a plane running parallel to the plane of the conveyor belt 2. The cycle belts 8, 8' each have a side facing the other cycle belt and the sides facing one another run parallel to one another and at a distance corresponding to the width of the support elements 1.

On their two outer sides the support elements 1 have a toothed structure so that when the support elements 1 are located between the cycle belts 8, 8', they are in engagement with them. As can be seen from FIG. 2, the toothed structure 9, 10, 11 is constructed on the support elements 1 such that the front teeth 9 and the rear teeth 11 have a greater distance from one another than the middle teeth 10. Furthermore, it is deduced from FIG. 1 that a sensor 12 to detect the draw-in position B is arranged between the drawing rollers 6, 6' and the pairs of toothed belt disks 7a, 7b, 7a', 7b'.

As can be deduced from FIG. 3, the draw-in position B of the support elements 1 is arranged such that only the two front teeth 9 seen in the transport direction T are engagement with the teeth of the cycle belts 8, 8'.

Also provided between the drawing rollers 6, 6' is a second sensor 13 through which a braking position is detected during the transport of the support elements 1 through the drawing rollers 6, 6' and if necessary the draw-in rollers 5, 5', a position after whose attainment the speed of the support elements 1 can be reduced or stopped.

If a packaging blank arranged in the receptacle 3 of a support element 1 is to be processed, with the support element 1 with the packaging blank, not shown, being in the waiting position A, the following process takes place: firstly, the draw-in rollers 5, 5' and the drawing rollers 6, 6' are set in motion so that a support element 1 is transported from the waiting position A to the draw-in position B. Since the distance d between the draw-in rollers 5, 5' and the drawing rollers 6, 6' is shorter than the side length s of the support elements 1, the support elements 1 are continuously guided by one of the two pairs of rollers whereby the movement of the support elements 1 is continuously inspected in this phase.

If a support element 1 is no longer in engagement with the draw-in rollers 5, 5', their drive is stopped so that subsequent support elements 1 must remain in front of the draw-in rollers 5, 5'. Thus, there is no "back pressure" from the subsequent support elements 1.

The drive of the drawing rollers 6, 6' is slowed at the instant when the sensor 13 notifies that the support element 1 has reached the braking position. If the sensor 12 notifies that the draw-in position B is reached, the drawing rollers 6, 6' are stopped.

As shown in FIG. 3, the two front teeth 9 of the toothed structure formed on the support elements 1 now rest on the teeth of the cycle belts 8, 8'. Since the front teeth 9 on the support elements 1 have a greater distance from one another than the middle teeth 10, acceptance by the cycle belts 8, 8' is facilitated. The precise positioning of the support elements 1 relative to the cycle belts 8, 8' is achieved merely by the middle teeth 10.

On reaching the draw-in position B, the signal from the sensor 12 which stops the drawing rollers 6, 6' is also used to set the pairs of toothed belt disks 7a, 7b and 7a', 7b' in rotation. As a result, the support element 1 is conveyed further by means of the cycle belts 8, 8' from the draw-in position B in the transport direction T until it has reached the processing position C. Here the movement of the pairs of toothed belt disks 7a, 7b; 7a', 7b' is stopped and the packaging blank (not shown) located in the support element 1 is processed. In this case, the packaging blank can be further formed, filled, provided with a pouring element or closed.

By using toothed belts toothed on the inside and on the outside and the toothed structure of the support elements 1, precise spatial positioning is achieved.

After the processing process has ended, the pairs of toothed belt disks 7a, 7b; 7a', 7b' are again set in motion and the support element 1 is conveyed further in the transport direction T until it is no longer in engagement with the fixed belt 8, 8'. From now on the support element 1 is conveyed further by the continuously running conveyor belt 2 and reaches the position D. The support element 1 is then transferred from the cycle belt 8, 8' onto the conveyor belt 2 without major vibrations since the rear teeth 11 of the support elements 1 have an enlarged distance from one another.

During the entire process described previously, the support elements 1 stand on the continuously moving conveyor belt 2. However, since the support elements 1 are neither in engagement with the draw-in rollers 5, 5', the drawing rollers 6, 6' or the cycle belts 8, 8', the movement of the support element 1 is not influenced by the movement of the conveyor belt 2. The conveyor belt 2 merely slides further under the bottom of the support element 1. Any lifting of the support element 1 can thus be omitted with precise spatial positioning of the support element 1 in the processing station nevertheless being made possible.

The invention claimed is:

1. A device for supplying and processing packages arranged on support elements with a continuously running conveyor belt, wherein the support elements are slideably arranged on the conveyor belt, the device having a drawing roller on each side of the conveyor belt whose axes of rotation are perpendicular to the plane of the conveyor belt, wherein two revolving cycle belts are provided after the drawing rollers seen in the running direction of the conveyor belt, wherein the cycle belts move in a plane perpendicular to the plane of the conveyor belt, wherein the cycle belts each have a side facing the other cycle belt and the sides facing one another run parallel to one another at a distance which corresponds to the width of the support elements to contact said support elements therebetween, whose axes of rotation are perpendicular to the plane of the conveyor belt, the cycle belts have a toothed structure on the sides facing one another and that the support elements are provided with a toothed structure on their two facing the cycle belts to contact said belt toothed structures.

2. The device according to claim 1, wherein the cycle belts are constructed as toothed belts which are each guided by two toothed-belt disks.

3. The device according to claim 1, wherein a sensor is provided to detect a draw-in position of the support elements.

4. The device according to claim 1, wherein the front teeth and rear teeth of the support elements seen in the transport direction have an enlarged spacing compared with the middle teeth.

5. The device according to claim 1, wherein the draw-in position of the support elements is arranged such that only the two front teeth of the support elements seen in the transport direction engage with the cycle belts.

6. The device according to claim 1, wherein a second sensor is provided to detect a braking position.

7. The device according to claim 1, wherein draw-in rollers are provided before the drawing rollers seen in the transport direction of the support elements, whose axes of rotation are arranged perpendicular to the plane of the conveyor belt.

8. The device according to claim 7, wherein the distance of the draw-in rollers from the drawing rollers is shorter than the side length of the support elements.

\* \* \* \* \*

UNITED STATES PATENT AND TRADEMARK OFFICE
CERTIFICATE OF CORRECTION

PATENT NO.         : 7,392,633 B2
APPLICATION NO. : 10/561824
DATED                 : July 1, 2008
INVENTOR(S)       : Michael Heil et al.

Page 1 of 1

It is certified that error appears in the above-identified patent and that said Letters Patent is hereby corrected as shown below:

Column 5, Claim 1, Lines 22-23, "on their two facing the cycle belts" should read -- on their two outer sides facing the cycle belts --

Signed and Sealed this

Seventh Day of April, 2009

JOHN DOLL
*Acting Director of the United States Patent and Trademark Office*